(12) United States Patent
Dumitras et al.

(10) Patent No.: US 8,130,834 B2
(45) Date of Patent: Mar. 6, 2012

(54) METHOD AND SYSTEM FOR VIDEO ENCODING USING A VARIABLE NUMBER OF B FRAMES

(75) Inventors: Adriana Dumitras, Sunnyvale, CA (US); Barin Geoffry Haskell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/025,802

(22) Filed: Feb. 11, 2011

(65) Prior Publication Data

US 2011/0194611 A1 Aug. 11, 2011

Related U.S. Application Data

(63) Continuation of application No. 10/743,722, filed on Dec. 24, 2003, now Pat. No. 7,889,792.

(51) Int. Cl.
*H04N 7/32* (2006.01)
*H04N 7/36* (2006.01)
*H04N 7/28* (2006.01)

(52) U.S. Cl. ............................. 375/240.13; 375/240.15
(58) Field of Classification Search ........................ None
See application file for complete search history.

(56) References Cited

U.S. PATENT DOCUMENTS

| | | |
|---|---|---|
| 5,185,819 A | 2/1993 | Ng et al. |
| 5,428,396 A | 6/1995 | Yagasaki et al. |
| 5,543,846 A | 8/1996 | Yagasaki |
| 5,548,346 A | 8/1996 | Mimura et al. |
| 5,565,920 A | 10/1996 | Lee et al. |
| 5,589,884 A | 12/1996 | Ohguchi |
| 5,592,226 A | 1/1997 | Lee et al. |
| 5,694,171 A | 12/1997 | Katto |

(Continued)

FOREIGN PATENT DOCUMENTS

DE 19737835 A1 3/1999

(Continued)

OTHER PUBLICATIONS

Ardizzone et al., "Video Indexing Using MPEG Motion Compensation Vectors," 1999 IEEE International Conference on Multimedia Computing and Systems, Jul. 1999, vol. 2, pp. 725-729.

(Continued)

*Primary Examiner* — David Czekaj
*Assistant Examiner* — David N Werner
(74) *Attorney, Agent, or Firm* — Kenyon & Kenyon LLP (57) ABSTRACT

An effective method for dynamically selecting the number of I, P and B frames during video coding is proposed. Short-term look-ahead analysis of a video sequence yields a variable number of B frames to be coded between any two stored pictures. The first picture of a group of frames (GOF) may be coded as a B picture. Motion speed is calculated for each picture of the GOF with respect to the first picture of the GOF. Subject to exceptions, as long as the subsequent pictures exhibit motion speeds that are similar and motion vector displacements that are co-linear with those of the first picture in the GOF, they may be coded as B pictures. When a picture is encountered having a motion speed that is not the same as that of the first picture in the GOF, the picture may be coded as a P picture. In some embodiments, a sequence of B pictures that terminates in a P picture may be called a "group of frames" (GOF).

31 Claims, 4 Drawing Sheets

U.S. PATENT DOCUMENTS

| | | | |
|---|---|---|---|
| 5,699,128 | A | 12/1997 | Hayashi |
| 5,745,182 | A | 4/1998 | Yukitake et al. |
| 5,751,358 | A | 5/1998 | Suzuki et al. |
| 5,757,968 | A | 5/1998 | Ando |
| 5,774,593 | A | 6/1998 | Zick et al. |
| 5,825,421 | A | 10/1998 | Tan |
| 5,852,473 | A | 12/1998 | Horne et al. |
| 6,122,014 | A | 9/2000 | Panusopone et al. |
| 6,160,846 | A | 12/2000 | Chiang et al. |
| 6,167,085 | A | 12/2000 | Saunders et al. |
| 6,307,886 | B1 | 10/2001 | Westermann |
| 6,333,949 | B1 | 12/2001 | Nakagawa et al. |
| 6,351,493 | B1 | 2/2002 | Reed et al. |
| 6,380,986 | B1 | 4/2002 | Minami et al. |
| 6,389,073 | B1 | 5/2002 | Kurobe et al. |
| 6,480,540 | B1 | 11/2002 | Guillotel |
| 6,480,670 | B1 | 11/2002 | Hatano et al. |
| 6,529,631 | B1 | 3/2003 | Peterson et al. |
| 6,600,872 | B1 | 7/2003 | Yamamoto et al. |
| 6,611,558 | B1 | 8/2003 | Yokoyama |
| 6,618,507 | B1 | 9/2003 | Divakaran et al. |
| 6,724,820 | B2 | 4/2004 | Ramanzin |
| 6,778,708 | B1 | 8/2004 | Divakaran et al. |
| 6,914,937 | B2 | 7/2005 | Takenaka |
| 6,940,903 | B2 | 9/2005 | Zhao et al. |
| 6,944,224 | B2 | 9/2005 | Zhao et al. |
| 7,003,038 | B2 | 2/2006 | Divakaran et al. |
| 7,058,130 | B2 | 6/2006 | Liu et al. |
| 7,110,452 | B2 | 9/2006 | Katsavounidis et al. |
| 7,197,072 | B1 | 3/2007 | Hsu et al. |
| 7,889,792 | B2 * | 2/2011 | Dumitras et al. ........ 375/240.13 |
| 2001/0026589 | A1 | 10/2001 | Sugiyama |
| 2002/0012452 | A1 | 1/2002 | Van Overveld et al. |
| 2002/0037051 | A1 | 3/2002 | Takenaka |
| 2002/0071489 | A1 | 6/2002 | Ramanzin |
| 2002/0131493 | A1 | 9/2002 | Fukuda et al. |
| 2002/0136297 | A1 | 9/2002 | Shimada et al. |
| 2002/0146071 | A1 | 10/2002 | Liu et al. |
| 2002/0150160 | A1 | 10/2002 | Liu et al. |
| 2002/0150162 | A1 | 10/2002 | Liu et al. |
| 2003/0007559 | A1 | 1/2003 | Lallet et al. |
| 2003/0058936 | A1 | 3/2003 | Peng et al. |
| 2003/0081672 | A1 | 5/2003 | Li |
| 2003/0142747 | A1 | 7/2003 | Obata et al. |
| 2003/0142748 | A1 | 7/2003 | Tourapis et al. |
| 2003/0169817 | A1 | 9/2003 | Song et al. |
| 2003/0202580 | A1 | 10/2003 | Noh et al. |
| 2004/0037357 | A1 | 2/2004 | Bagni et al. |
| 2004/0047418 | A1 | 3/2004 | Tourapis et al. |
| 2005/0013365 | A1 | 1/2005 | Mukerjee et al. |

FOREIGN PATENT DOCUMENTS

| | | |
|---|---|---|
| EP | 0658057 A2 | 6/1995 |
| EP | 0762778 A2 | 3/1997 |
| EP | 0987903 A1 | 3/2000 |
| EP | 1005229 A2 | 5/2000 |
| GB | 2263602 A | 7/1993 |
| WO | 9907159 A2 | 2/1999 |
| WO | 0067486 A1 | 11/2000 |
| WO | 2004010709 A1 | 1/2004 |
| WO | 2004036920 A1 | 4/2004 |

OTHER PUBLICATIONS

Accame et al., "An Integrated Approach to Block Based Motion Estimation for Video Coding," IEEE Transactions on Consumer Electronics, IEEE Inc., New York, US, vol. 44, No. 1, pp. 52-61, XP000779250, ISSN: 098-3063, see paragraph '2.A.A!, Feb. 1998.

Conklin et al., "A comparison of temporal scalability technologies," IEEE Transactions on Circuits and Systems for Video Technology, vol. 9, No. 6, pp. 909-919, Sep. 1999.

Flierl et al., "Rate-constrained multihypothesis prediction for motion-compensated video compression," IEEE Trans. on Circuits and Systems for Video Technology, vol. 12, No. 11, pp. 957-969, Nov. 2002.

Flierl et al., "Generalized B pictures and the Draft H.264/AVC video compression standard," IEEE Trans. on Circuits and Systems for Video Technology, vol. 13, No. 7, pp. 587-597, Jul. 2003.

Gargi, U.; R. Kasturi; and S.H. Strayer, "Performance characterization of video shot change detection methods," IEEE Trans. on Circuits and Systems for Video Technology, Feb. 2000, pp. 1-13, vol. 10, No. 1.

Hanjalic, A., "Shot-boundary detection: Unraveled and resolved ?," IEEE Trans. on Circuits and Systems for Video Technology, Feb. 2002, pp. 90-105, vol. 12, No. 2.

He, Zhihai, Y.K. Kim, and S.K. Mitra, "Low-delay rate control for DCT video coding via ρ-domain source modeling," IEEE Trans. on Circuits and Systems for Video Technology, Aug. 2001, vol. 11, No. 8.

He, Zhihai and S.K. Mitra, "Optimum bit allocation and accurate rate control for video coding via ρ-domain source modeling," IEEE Trans. on Circuits and Systems for Video Technology, Oct. 2002, pp. 840-849, vol. 12, No. 10.

He, Zhihai and S.K. Mitra, "A unified rate-distortion analysis framework for transform coding," IEEE Trans. on Circuits and Systems for Video Technology, Dec. 2001, pp. 1221-1236, vol. 11, No. 12.

Huang, C L. and B.Y. Liao, "A robust scene-change detection method for video segmentation," IEEE Transaction on Circuits and Systems for Video Technology, vol. 11, No. 12, Dec. 2001, pp. 1281-1288.

International Business Machines Corporation, "Dynamic-GOP for a MPEG-2 Video Compression," Research Disclosure, Apr. 1, 1999, pages (whole document), vol. 42, No. 420, Kenneth Mason Publications, Hampshire, GB.

Lan et al., "Scene-context-dependent reference-frame placement for MPEG video coding," IEEE Transactions on Circuits and Systems for Video Technology, Apr. 1999, pp. 478-489, vol. 9, No. 3, New York, US, XP000824572, ISSN: 1051-8215.

Lan, Anthony Y., A.G. Nguyen, and J-N Hwang, "Scene-context-dependent reference-frame placement for MPEG video coding," IEEE Trans. on Circuits and Systems for Video Technology, Apr. 1999, pp. 478-489, vol. 9, No. 3.

Lee, Jungwoo and Bradley W. Dickinson, "Rate-Distortion optimized frame type selection for MPEG encoding," IEEE Trans. on Circuits and Systems for Video Technology, Jun. 1997, pp. 501-510, vol. 7, No. 3.

Lee, Jungwoo and Bradley W. Dickinson, "Temporally adaptive motion interpolation exploiting temporal masking in visual perception," IEEE Trans. on Image Processing, Sep. 1994, pp. 513-526, vol. 3, No. 5.

Liu, H.C. et al.: "Scene Decomposition of MPEG Compressed Video" Proceedings of the Spie, Spie Bellingham, VA, US, vol. 2419, Feb. 7, 1995, pp. 26-37, XP000671108 ISSN: 0277-786X the whole document.

Mietens et al., "New scalable three-stage motion estimation technique for mobile MPEG encoding," Multimedia and Expo, 2002, ICME '02. Proceedings, 2002 IEEEInternational Conference in Lausanne, Switzerland, Aug. 26-29, 2002, Piscataway, NJ, USA, IEEE, vol. 1, pp. 685-688, XP010604461, ISBN: 0-7803-7304-9, paragraph '0003!, Aug. 26, 2002.

Ohm, J.R. Digitale Bildcodierung, 1995, pp. 127-130, springer-Verlag, Heidelbert, XP002350026, (Mar. 1995).

Peker, K.A., et al. "A Novel Pair-wise Comparison Based Analytical Framework for Automatic Measurement of Intensity of Motion Activity of Video Segments," 2001 IEEE International Conference on Multimedia and Expo, Aug. 22, 2001, pp. 936-939, IEEE, US.

Ramkishor, K., et al., "Adaptation of Video Encoders for Improvement in Quality" Proceedings of the 2003 IEEE International Symposium on Circuits and Systems, May 25, 2003, pp. 11-693, IEEE, Piscataway, NJ, USA.

Shanableh et al., "The importance of the bi-directionally predicted pictures in video streaming," IEEE Transactions on Circuits and Systems for Video Technology, vol. 11, No. 3, pp. 402-414, Mar. 2001.

Tourapis, A.M. et al. "Direct Mode Coding for Bi-Predictive Pictures in the JVT Standard," Proceedings of the 2003 International Symposium on Circuits and Systems (ISCAS '03), May 2003, vol. 2, pp. 700-703.

Turaga, Deepak and T. Chen, "Classification based mode decisions for video over networks," IEEE Trans. on Multimedia, Mar. 2001, pp. 41-52, vol. 3, No. 1.

Vlachos, T., "Cut detection in video sequences using phase correlation," IEEE Signal Processing Letters, Jul. 2000, pp. 173-175, vol. 7, No. 7.

Wenger, Stephan, "H.264/AVC over IP," IEEE Trans. on Circuits and Systems for Video Technology, Jul. 2003, pp. 645-656, vol. 13, No. 7.

Yuen et al., "A survey of hybrid MC/DPCM/DCT video coding distortions," Signal Processing, Nov. 30, 1998, pp. 247-278, vol. 70, No. 3, Elsevier Science Publishers B.V., Amsterdam, NL, XP004144969, ISSN: 0165-1684.

Yeo, B-L, and B. Liu, "Rapid scene analysis on compressed video," IEEE Trans. on Circuits and Systems for Video Technology, Dec. 1995, pp. 533-544, vol. 5, No. 6.

Zhang, H.J., C.Y. Low, and S.W. Smoliar, "Video parsing and browsing using compressed data," Multimedia Tools and Applications, Mar. 1995, pp. 89-111, vol. 1, No. 1.

Bescos et al., "Multidimensional comparison of shot detection algorithms," Proceedings of the International Conference on Image Processing, vol. 2, pp. 401-403, Dec. 2002.

Cernekova et al., "Shot detection in video sequences using entropy-based metrics," Proceedings of the International Conference on Image Processing, vol. 3, pp. 421-424, Jun. 2002.

Dumitras, Adriana and Haskell, Barry G., "I/P/B frame type decision by collinearity of displacements," Proceedings of IEEE Intl. Conference on Image Processing, Oct. 2004.

Fernando et al., "Scene adaptive video encoding for MPEG and H.263+ video," IEEE Tran. on Computer Electronics, vol. 47, No. 4, pp. 76-79, Nov. 2001.

Ford et al., "Metrics for shot boundary detection in video sequences," Multimedia Systems, vol. 8, pp. 37-46, Jan. 2000.

Gu, X. and Zhang, H., "Implementing dynamic GOP in video encoding," in IEEE Intl. Conference on Multimedia and Expo (ICME), pp. 349-352, Jul. 2003.

Hoang, D.T. et al., "Efficient algorithms for MPEG video compression," p. 141, paragraph 7.2.2, John Wiley & Sons, Feb. 2002, XP002367661.

Lee, J. and B.W. Dickinson, "Scene-adaptive motion interpolation structures based on temporal masking in human visual perception," in Proc. SPIE Conference on Visual Comm. and Image Processing, pp. 499-501, Cambridge, Oct. 1993.

Liu, H.C., and G. Zick, "Automatic determination of scene changes in MPEG compressed video," in Proc. IEEE Symp. Circuits and Systems, Apr. 30-May 3, 1995, pp. 764-767, vol. 1, Seattle, WA.

Meng et al., "Scene change detection in a MPEG compressed video sequence," in Digital Video Compression: Algorithms and Technologies, vol. SPIE-2419, pp. 14-25, Feb. 1995.

Mitchell et al., "MPEG video compression standard," p. 79, Chapman & Hall, Oct. 1996, XP002367660.

Richardson, "H.264 and MPEG-4 Video Compression, video coding for next-generation multimedia," pp. 175, 176 & 210, Wiley, Aug. 2003, XP002367662.

Shahraray, B., "Scene change detection and content-based sampling of video sequences," in Digital Video Compression: Algorithms and Technologies, pp. 2-13, vol. SPIE-2419, Feb. 1995.

* cited by examiner

METHOD AND SYSTEM FOR VIDEO ENCODING USING A VARIABLE NUMBER OF B FRAMES

RELATED APPLICATIONS

This application is a continuation of U.S. patent application Ser. No. 10/743,722 filed on Dec. 24, 2003.

BACKGROUND

Video encoder optimization for bit rate reduction of the compressed bitstreams and high visual quality preservation of the decoded video sequences encompasses solutions such as rate-distortion optimized mode decisions and parameter selections, frame type selections, background modeling, quantization modeling, perceptual modeling, analysis-based encoder control and rate control.

Generally, many video coding algorithms first partition each frame or video object plane (herein, "picture") into small subsets of pixels, called "pixelblocks" herein. Then each pixelblock is coded using some form of predictive coding method such as motion compensation. Some video coding standards, e.g., ISO MPEG or ITU H.264, use different types of predicted pixelblocks in their coding. In one scenario, a pixelblock may be one of three types: Intra (I) pixelblock that uses no information from other pictures in its coding, Unidirectionally Predicted (P) pixelblock that uses information from one preceding picture, and Bidirectionally Predicted (B) pixelblock that uses information from one preceding picture and one future picture.

Consider the case where all pixelblocks within a given picture are coded according to the same type. Thus, the sequence of pictures to be coded might be represented as

I1 B2 B3 B4 P5 B6 B7 B8 B9 P10 B11 P12 B13 I14 . . .

Figure 5A:
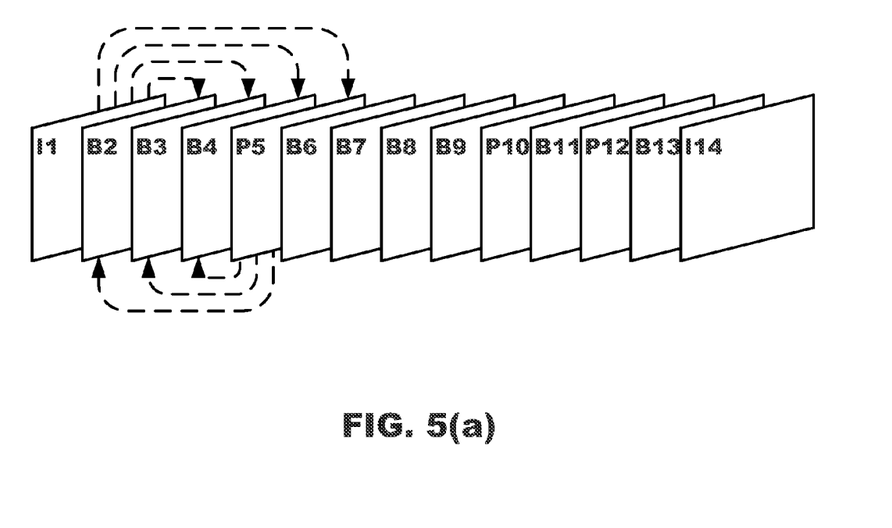
FIG. 5 illustrates exemplary frame assignments in display order and coding order.

This is shown graphically in FIG. 5(a) where designations I, P, B indicate the picture type and the number indicates the camera or display order in the sequence. In this scenario, picture I1 uses no information from other pictures in its coding. P5 uses information from I1 in its coding. B2, B3, B4 all use information from both I1 and P5 in their coding.

Since B pictures use information from future pictures, the transmission order is usually different than the display order. For the above sequence, transmission order might occur as follows:

I1 P5 B2 B3 B4 P10 B6 B7 B8 B9 P12 B11 I14 B13 . . .

Figure 5B:
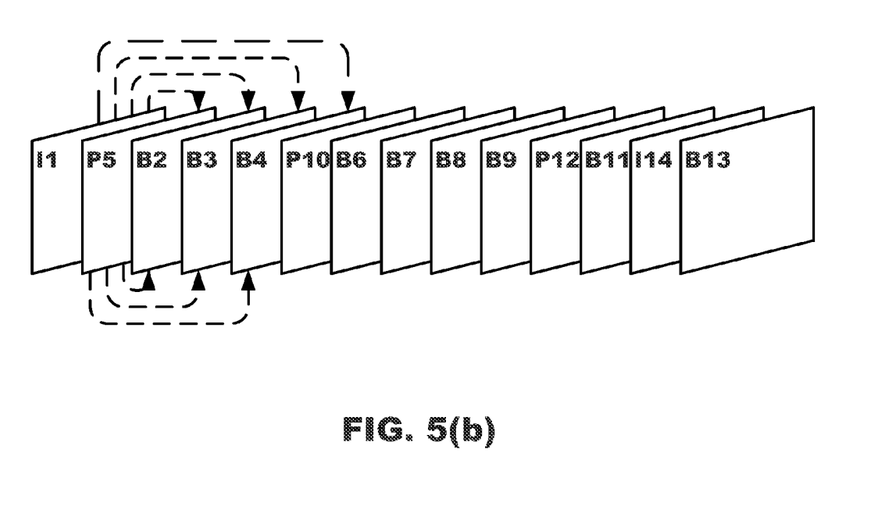

This is shown graphically in FIG. 5(b).

Thus, when it comes time to decode B2 for example, the decoder will have already received and stored the information in I1 and P5 necessary to decode B2, similarly B3 and B4. The receiver then reorders the sequence for proper display. In this operation I and P pictures are often referred to as "stored pictures."

The coding of the P pictures typically utilizes Motion Compensation predictive coding, wherein a Motion Vector is computed for each pixelblock in the picture. Using the motion vector, a prediction pixelblock can be formed by translation of pixels in the aforementioned previous picture. The difference between the actual pixelblock in the P picture and the prediction block, (the residual) is then coded for transmission.

Each motion vector may also be transmitted via predictive coding. That is, a prediction is formed using nearby motion vectors that have already been sent, and then the difference between the actual motion vector and the prediction is coded for transmission. Each B pixelblock typically uses two motion vectors, one for the aforementioned previous picture and one for the future picture. From these motion vectors, two prediction pixelblocks are computed, which are then averaged together to form the final prediction. As above the difference between the actual pixelblock in the B picture and the prediction block is then coded for transmission.

As with P pixelblocks, each motion vector of a B pixelblock may be transmitted via predictive coding. That is, a prediction is formed using nearby motion vectors that have already been transmitted, and then the difference between the actual motion vector and the prediction is coded for transmission.

However, with B pixelblocks the opportunity exists for interpolating the motion vectors from those in the co-located or nearby pixelblocks of the stored pictures. The interpolated value may then be used as a prediction and the difference between the actual motion vector and the prediction coded for transmission. Such interpolation is carried out both at the coder and decoder.

In some cases, the interpolated motion vector is good enough to be used without any correction, in which case no motion vector data need be sent. This is referred to as Direct Mode in H.263 and H.264. This works particularly well when the camera is slowly panning across a stationary background. In fact, the interpolation may be good enough to be used as is, which means that no differential information need be transmitted for these B pixelblock motion vectors. Within each picture the pixelblocks may also be coded in many ways. For example, a pixelblock may be divided into smaller sub-blocks, with motion vectors computed and transmitted for each sub-block. The shape of the sub-blocks may vary and need not be square.

Within a P or B picture, some pixelblocks may be better coded without using motion compensation, i.e., they would be coded as Intra (I) pixelblocks. Within a B picture, some pixelblocks may be better coded using unidirectional motion compensation, i.e., they would be coded as forward predicted or backward predicted depending on whether a previous picture or a future picture is used in the prediction.

Prior to transmission, the prediction error of a pixelblock or sub-block is typically transformed by an orthogonal transform such as the Discrete Cosine Transform or an approximation thereto. The result of the transform operation is a set of transform coefficients equal in number to the number of pixels in the pixelblock or sub-block being transformed. At the receiver/decoder, the received transform coefficients are inverse transformed to recover the prediction error values to be used further in the decoding.

Not all the transform coefficients need be transmitted for acceptable video quality. Depending on the transmission bit rate available more than half, sometimes much more than half, of the transform coefficients may be deleted and not transmitted. At the decoder their values are replaced by zeros prior to inverse transform.

Also, prior to transmission the transform coefficients are typically quantized and entropy coded. Quantization involves representation of the transform coefficient values by a finite subset of possible values, which reduces the accuracy of transmission and often forces small values to zero, further reducing the number of coefficients that are sent. In quantization typically, each transform coefficient is divided by a quantizer step size Q and rounded to the nearest integer. For example, the transform coefficient C would be quantized to the value $C_q$ according to:

$$C_q = \frac{\left(C + \frac{Q}{2}\right)}{Q}$$

The integers are then entropy coded using variable word-length codes such as Huffman codes or arithmetic codes.

The sub-block size and shape used for motion compensation may not be the same as the sub-block size and shape used for the transform. For example, 16×16, 16×8, 8×16 pixels or smaller sizes are commonly used for motion compensation whereas 8×8 or 4×4 pixels are commonly used for transforms. Indeed the motion compensation and transform sub-block sizes and shapes may vary from pixelblock to pixelblock.

A video encoder must decide what is the best way amongst all of the possible methods (or modes) to code each pixelblock. This is known as the mode selection problem. Depending on the pixelblock size and shape, there exist several modes for intra and inter cases, respectively.

A video encoder must also decide how many B pictures, if any, are to be coded between each I or P picture. This is known as the frame type selection problem, and again, ad hoc solutions have been used. Typically, if the motion in the scene is very irregular or if there are frequent scene changes, then very few, if any, B pictures should be coded. On the other hand, if there are long periods of slow motion or camera pans, then coding many B-pictures will result in a significantly lower overall bit rate. Moreover, a higher number of coded B frames makes possible achieving temporal/computational scalability at the decoder without impacting greatly the visual quality of the decoded sequence and the computational complexity of the decoder. Consequently, platforms and systems with various CPU and memory capabilities can make use of streams coded using numerous B frames.

Modern encoders typically select the number of B frames that occur between each I or P picture to be equal to one or two. This predetermined and somewhat arbitrary decision is motivated by experimental work, which shows that for most video sequences the above decision reduces the bit rate without affecting negatively the visual quality of the decoded sequences. The opportunity exists, however, to reduce the bit rate much more for sequences that exhibit slow motion or camera pans by increasing the number of B frames. It is believed that current coding systems do not take advantage of this opportunity, due to (a) the difficulty of the I/P/B decision and (b) the increase in the encoder's computational complexity that the implementation of the frame type decision would determine. Indeed, the appropriate number of B frames to be coded for each sequence not only depends on both the temporal and spatial characteristics of the sequence but it may vary across the sequence as the motion characteristics often change and a selection of different numbers of B frames for each different part of the sequence is typically required. Accordingly, there is a need in the art for a computationally inexpensive coding assignment scheme that dynamically assigns a number of B pictures to occur between reference pictures (I- and P-pictures) based on picture content.

DETAILED DESCRIPTION

Embodiments of the present invention provide a frame type selector for a video coder.

This selector assigns input pictures from a video sequence for intra coding, predictive coding or bidirectionally predictive coding. According to the embodiment, the first picture following an I or P picture may be coded as a B picture. For all pictures subsequent thereto, motion speed may be calculated with respect to the reference picture, the I or P picture. Subject to exceptions, as long as the subsequent pictures exhibit generally similar, constant or almost constant motion speed, they may be coded as B pictures. When a picture having an irregular motion speed is encountered, then that picture may be coded as a P picture. In some embodiments, a sequence of B pictures that terminates in a P picture may be called a "group of frames" (GOF). The frame with irregular motion speed may terminate a current GOF.

Figure 1:
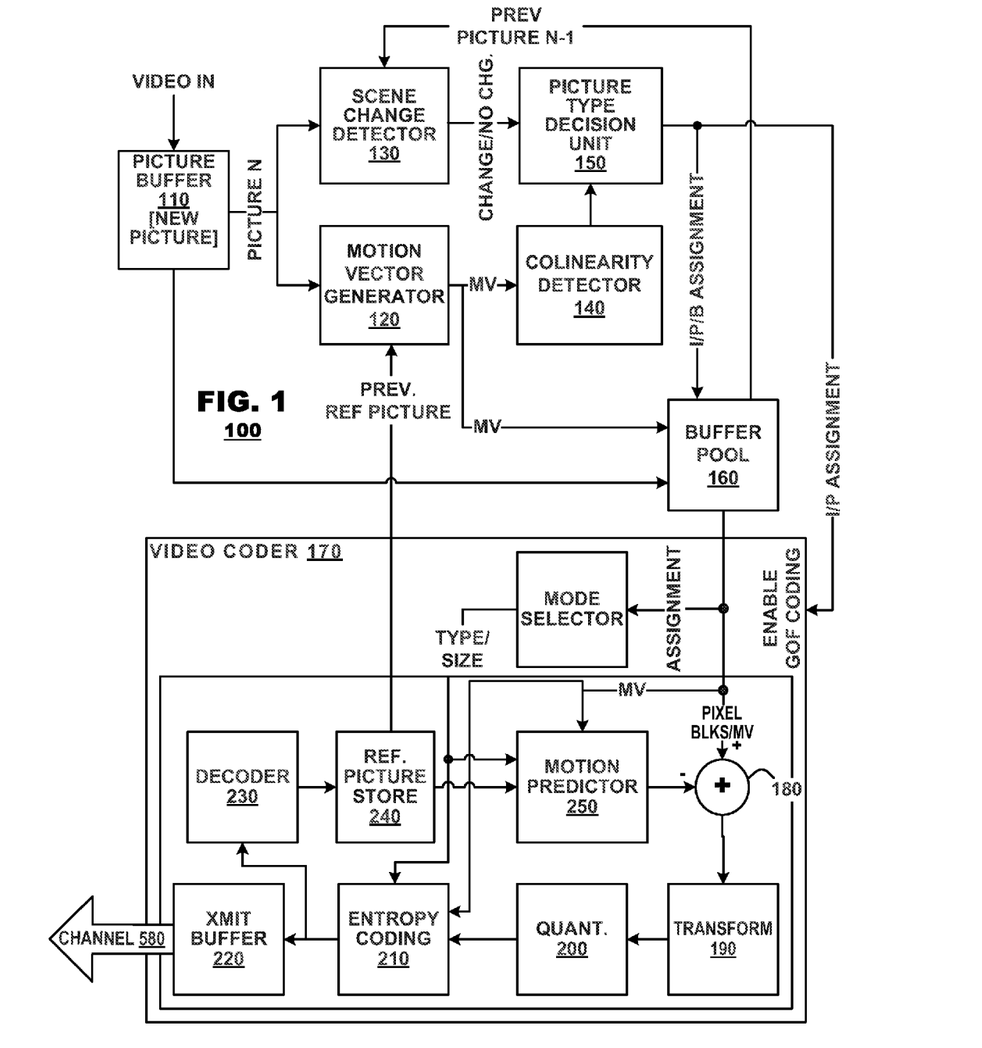
FIG. 1 is a block diagram illustrating operation of a frame type selector according to an embodiment of the present invention.

FIG. 1 is a block diagram illustrating operation of a frame type selector 100 according to an embodiment of the present invention. The frame type selector 100 may include a picture buffer 110, a motion vector generator 120, a scene change detector 130, a colinearity detector 140 and a picture type decision unit 150. The picture buffer 110 stores video data of a current picture n and furnishes it to the motion vector generator 120 and scene change detector 130. A reference picture, a previous I or P picture, is available to the motion vector generator 120 from storage in a video coder 170. A previous picture n–1 (in display order) is available to the scene change detector 130, provided by a buffer pool 160.

The motion vector generator 120, as its name implies, identifies relative motion between image information in the current picture n and the reference picture of the previous GOF. Motion vector calculation is well known in the video coding arts. Generally, it involves comparing blocks of image data from a candidate picture of video data (picture n) to blocks of image data in the reference picture that are generally spatially co-incident. If a matching block is found in the reference picture, the motion vectors represent spatial displacement between the block's location in picture n and the matching block's location in the reference picture. Thus, a set of motion vectors is generated for each pixelblock in picture n. The motion vector generator 120 may output motion vectors (labeled, "MV" in FIG. 1) to the colinearity detector 140 and to the buffer pool 160. In the buffer pool 160, the motion vectors of a picture n may be stored in association with the video data for later use during video coding 170.

The colinearity detector 140 determines whether the motion vectors of the new picture n demonstrate a general flow of motion that is consistent with the flow of motion obtained from a prior sequence of pictures (from the prior reference picture P to picture n–1). The colinearity detector 140 may generate an output representing a degree of difference between the colinearity of motion vectors of picture n and the motion vectors of the first picture in the GOF of the video sequence.

The scene change detector 130, as its name implies, can identify scene changes in the source video data. Various scene change detectors 130 are known in the art and can be integrated into the system of FIG. 1. When a scene change is detected, detector 130 indicates the change to the picture type decision unit 150.

The picture type decision unit 150 may determine how each picture is to be coded. It generates control signals to the picture buffer 160 and video coder 170 in response to these picture assignment decisions. When the picture type decision unit 150 assigns the current picture n to be coded as a B-picture, it may cause the video data of picture n and its associated motion vectors to be stored in the buffer pool 160 to await later coding and may advance operation to the next picture (picture n+1).

When the picture decision unit 150 determines that picture n shall be coded as a P picture, the picture decision unit 150 may enable the video coder 170, causing it to code all pictures of the GOF stored in the buffer pool 160. All pictures that follow the previously coded P picture, including the newly assigned P picture and any B pictures that occur between the new P picture and the previously coded P picture are coded by the video coder 170. Operation of the frame type selector 150 may advance to a new input picture n+1 and repeat the above decision steps using the frames of the new GOF.

In an embodiment, the picture decision unit 150 also could decide to code a picture as an I picture to satisfy other coding policies that are provided to support random access to video frames and the like. In this case, the picture type decision unit 150 may also cause the video coder 170 to code all pictures resident in buffer pool 160 up to and including the newly assigned I picture.

As the foregoing description indicates, the frame type selector 100 may process groups of frames from input video data. Each GOF may have the form BB . . . BP (or, alternatively, BB . . . BI). When input image data indicates generally consistent (i.e., similar, constant or almost-constant speed) motion among video content, the pictures that exhibit the consistent motion are assigned as B pictures to the extent possible. When the constant motion speed terminates, a picture may be designated as a P picture. The B pictures may be coded using the P picture of the previous group of pictures and the newly identified P picture as reference pictures. Because all of the B pictures are identified as exhibiting generally constant motion speed, coding should be particularly efficient.

FIG. 1 also provides a simplified block diagram of a video coder 170. As explained above, the video coder 170 may include a coding chain that generates residual pixel data from a comparison of input video data and predicted video data (subtractor 180). Residual pixel data may be subject to an orthogonal transformed 190, quantized 200 and entropy coded 210. Coding of elements 180-210 may be performed on each pixelblock of a picture. Coded block data from the entropy coder 210 may be stored in a transmit buffer 220, typically on a picture-by-picture basis, until it is transmitted to a channel.

Video coders 170 typically include a decoding chain that reconstructs image data in a manner that replicates operations to be performed by a decoder (not shown) that receives coded video data from a channel. Here, the decoding chain is shown as including a decoder 230, a reference picture store 240, and a motion or spatial predictor 250. The decoder 230 inverts operation of elements 180-210 and generates reconstructed image data that can be stored 240 as reference pictures for further prediction. Reference pictures in storage 240 also may be input to the motion vector generator 120 for use in building GOFs as described above. For motion prediction in P and B frames, the motion predictor 250 may forward selected image data from the reference pictures motion vectors to the subtractor 180. For motion prediction in P or B coding modes, the selected image data is identified by the motion vectors, which In embodiments of the present invention, some of the motion vectors can be generated by the motion vector generator 120.

According to an embodiment, the picture type assignment techniques illustrated in FIG. 1 may be integrated into an overall picture assignment policy that considers additional factors when assigning coding types to individual pictures. In some instances, for example, when applications require coding and transmission of I frames at regular intervals to enable random access, a picture may be coded as an I picture even if the frame type decision process of FIG. 1 otherwise would assign the picture to P or B coding. Other applications, such as videoconferencing applications, insert I frames into a stream of coded video data at regular time intervals to permit rapid synchronization if data were lost due to transmission errors. Since an I frame has been coded without any reference to other frames, decoding of the I frame would not be affected by errors in prior frames.

FIG. 1 illustrates the picture buffer 110 and buffer pool 160 as discrete elements for purposes of illustration only. In implementation, these elements may be provided as members of a larger memory space for storage of video data generally.

In another embodiment, when a scene cut occurs between two pictures n and n−1 and the picture before the scene cut n−1 is not the first frame of GOF, then a picture type decision may assign picture n−1 as a P frame and picture n as either an I or a P frame. In this embodiment, the pictures n−1 and n may be coded at either full quality of low quality. Full quality means using the same coding parameters as for previous pictures. Low quality means reducing the spatial quality of the picture, typically by increasing the value of the quantization in 200.

In a further embodiment, when a scene cut occurs between two pictures n and n−1, picture type decision may permit the GOF to continue and assign a B frame to the next picture after the scene cut (picture n). When the maximum number of B frames (decided in the coding system) has been exceeded, a new frame may be assigned for P coding, yielding a pattern PB . . . B‖B . . . BP (where ‖ represents the position of the scene cut). Optionally, B pictures that are members of a GOF that includes a scene cut may be coded at low quality relative to pictures from other GOFs.

The picture type decision scheme discussed so far provides several advantages in video coding applications. First, because it favors coding of consecutive pictures that exhibit similar motion properties (i.e., constant or almost-constant motion speed) as B pictures, it yields lower bit rates of the compressed streams. Second, the picture type decision scheme is computationally inexpensive. The computation of motion speeds and speed errors requires simple operations. Moreover, the motion vectors computed for the purpose of frame type decision are re-used during the coding of B and P pictures. Thus, in the aggregate, the expense associated with the picture type assignment scheme of the present embodiments is minimal. Third, coding using several B pictures in appropriate contexts also provides a simple form of scalability for use with video decoders of varying capability. B pictures typically are not reference pictures for other pictures and, therefore, some video decoders can elect to drop selected B pictures to simplify their decoding operation and still obtain useful reconstructed data.

The picture type assignment scheme of the foregoing embodiments provides advantages over, for example, a brute force approach that simply would code every combination of B pictures and pick the combination that minimized bit rate of the output coded video signal. The brute force approach is far too complex. It would requires a very large number of trial-and-error operations, most of which must be discarded once a final decision is made. By contrast, the present invention provides a frame type assignment scheme that requires far less computational expense and higher efficiency—as noted, motion vector computations from frame type assignment may be re-used when the video data is coded.

Figure 2:
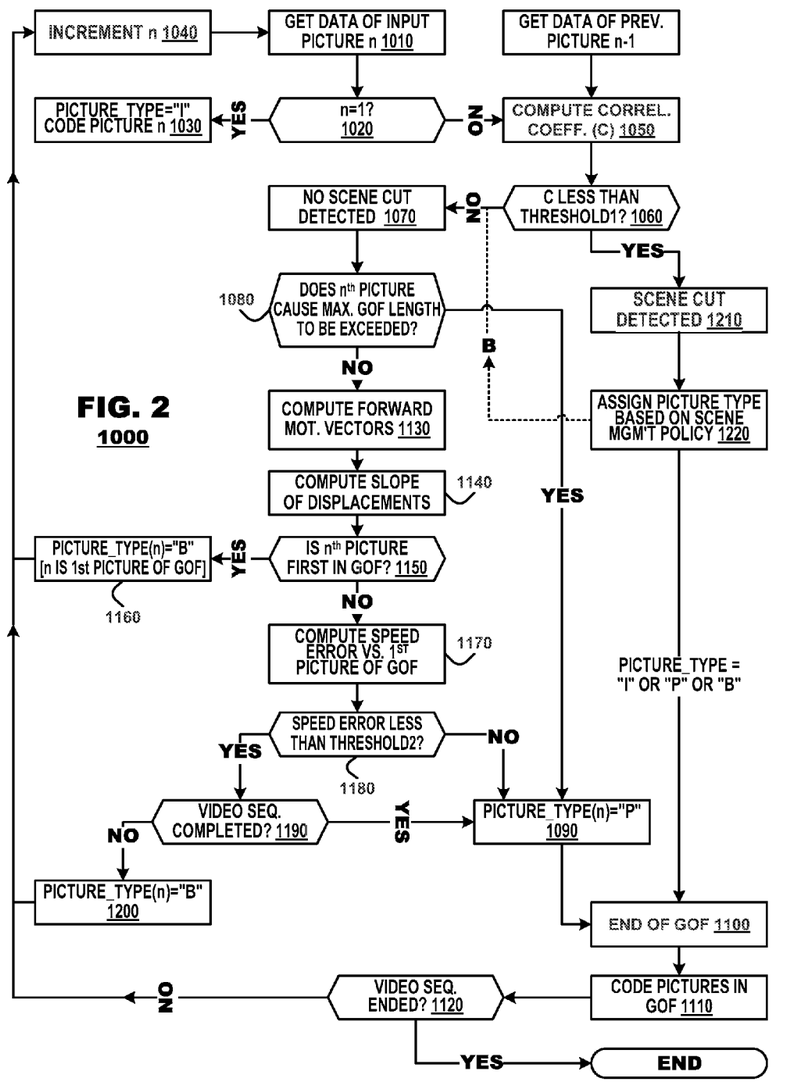
FIG. 2 is a flow diagram illustrating a method according to an embodiment of the present invention.

FIG. 2 is a flow diagram illustrating a method according to an embodiment of the present invention. The method 1000 may begin with consideration of a new picture n from a sequence of video data (box 1010). The method 1000 may determine if the new picture is the first picture in the sequence (box 1020). If so, the method may assign the picture's type as an I-picture and have the picture coded (box 1030). Thereafter, the method 1000 may advance to the next picture (box 1040) and return to box 1010.

For pictures other than the first picture in the video sequence, the method 1000 may determine whether a scene cut has occurred. In one embodiment, the method 1000 computes a correlation coefficient between the current picture n and the previous picture n−1 (box 1050). If the correlation coefficient is higher than some predetermined threshold (box 1060), then the method 1000 may determine that no scene cut occurred (box 1070). Thereafter, the method may determine whether the $n^{th}$ picture causes a length of a current group of pictures to meet a predetermined maximum length set for the system (box 1080). If so, then picture n may be assigned to be a P-picture (box 1090). The P-picture decision terminates the current GOF (box 1100) and causes the video pictures of the GOF to be coded (box 1110). Thereafter, unless the method 1000 has reached the end of the video sequence (box 1120), the method advances to the next picture (box 1040) and repeats operation (box 1010).

If at box 1080 the method 1000 determines that the $n^{th}$ picture does not cause the maximum GOF length to be reached, the method may compute forward motion vectors between picture n and the reference picture of the previous GOF (typically, a P picture) (box 1130) and also compute the slope of the motion vector displacements (box 1140). If the current picture n is the first picture of a new GOF (box 1150), the method may assign the picture's type to be a B-picture (box 1160) and advance operation to the next picture (boxes 1040, 1010). Otherwise, the method 1000 may compute a speed error from the displacement slopes of the current picture and the first picture in the GOF (box 1170). If the speed error exceeds some predetermined threshold (box 1180), then the picture may be assigned as a P-picture (box 1090). Again, the P picture assignment terminates a current GOF and causes pictures of the GOF to be coded (boxes 1100, 1110).

If the speed error does not exceed the threshold (box 1180), the method 1000 may determine whether the current picture is the last picture of the video sequence (box 1190). If so, the method 1000 again may advance to box 1090, assign the picture to be a P-picture and code the GOF (boxes 1100, 1110) before terminating. Otherwise, the method 1000 may assign the current picture to be a B-picture (box 1200) and advance operation to the next picture in the video sequence (boxes 1040, 1010).

Returning to box 1060, if the correlation coefficient is smaller than the scene cut threshold, the method 1000 may determine that a scene cut occurred (box 1210). The method may assign a picture type based on a scene management policy for the system (box 1220). In the simplest embodiment, the scene management policy may dictate that the first picture following a scene cut shall be coded as an I-picture. Other embodiments may assign to code the picture as either an I-picture or P-picture depending upon the relative bandwidth consumed by these coding choices. If the picture is assigned to be an I-picture or a P-picture, the assignment terminates the GOF (box 1100) and causes pictures therein to be coded (box 1110). Further, other embodiments may assign to code the picture after the scene cut as the picture type decision dictates, with the provision that, in the case such a decision is to encode the picture as a B frame, measures are taken to prevent the B frame from referencing any picture prior to the scene cut.

In one embodiment, a scene cut decision may be made based upon a correlation coefficient established for each of two temporally adjacent frames. A correlation coefficient C for a frame n may be computed according to:

$$C(n) = \frac{\sum_{i=1}^{M}\sum_{j=1}^{N} x_n(i,j) x_{n+1}(i,j)}{\sum_{i=1}^{M}\sum_{j=1}^{N} x_n^2(i,j) \sum_{i=1}^{M}\sum_{j=1}^{N} x_{n+1}^2(i,j)},$$

where
$x_n(i,j)$ and $x_{n+1}(i,j)$ respectively represent pixel values at pixel locations (i,j) in pictures n and n+1, and M and N represent the width and height of pictures n and n+1. By comparing correlation coefficients for two adjacent pictures (e.g., pictures n and n+1), scene changes may be detected. Small values of the correlation coefficients imply that two adjacent pictures have content that is sufficiently different to be classified as a scene change. As noted, alternative scene change detection techniques are permitted for use with embodiments of the present invention.

Figure 3:
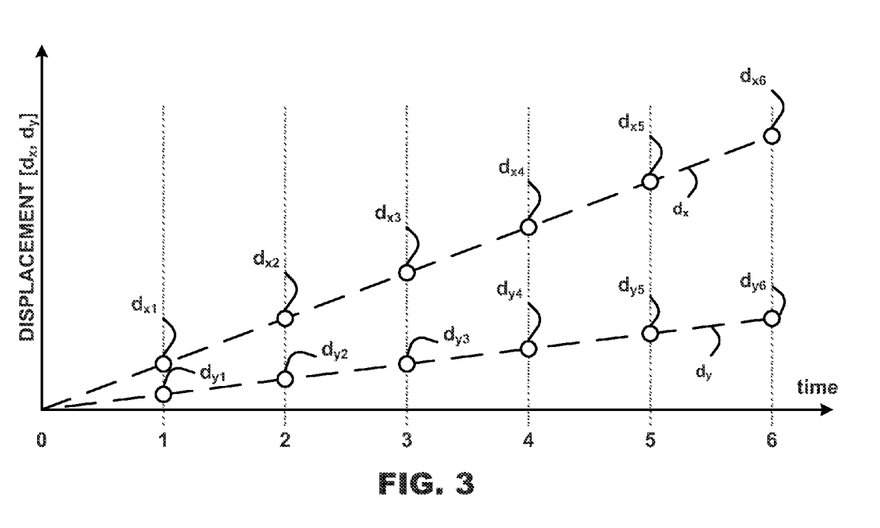
FIG. 3 is a graph illustrating ideal colinearity among the motion vectors in a series of frames.

FIG. 3 is a graph illustrating ideal colinearity among a series of pictures. As noted, motion vectors generally represent a displacement between a block in a current picture and a closely matching block from some reference picture. Displacement typically is represented by two components, along the x and y axes. Therefore, for a picture 1, a motion vector with the components $(d_{x1}, d_{y1})$ may be obtained that measures the displacement between picture 1 and a reference picture 0. Assuming a constant time interval between pictures, colinearity would be observed in picture 2 if the motion vector of the displaced block, having the components $(d_{x2}, d_{y2})$ were twice the magnitude of the motion vector for the block in picture 1. The block in picture 2 is temporally displaced from the block in reference picture 0 twice as much as the block in picture 1 and, therefore, the motion vectors should be twice the size as those for picture 1 in conditions of perfect colinearity. By extension, in conditions of perfect colinearity, pictures 3, 4, 5 and 6 all should have motion vectors that are equal to the motion vectors for picture 1 when scaled according to the relative temporal displacements of each picture 3, 4, 5 and 6 to the reference picture 0. The motion vector components $d_x$, $d_y$ for each block and each picture would define lines with a common slope as shown in FIG. 3.

In practice, of course, perfect colinearity will not always be observed. Accordingly, the motion vector of the first picture in a GOF (picture 1 in the example of FIG. 3), may be selected as the reference with respect to which the speed errors (i.e., the slope errors) are computed. Successive pictures may be tested to determine whether the slopes of motion vector displacements for those pictures are within suitable tolerances of the reference slope and, if so, to include the pictures in a GOF as B pictures. When a picture's displacement slope falls outside the defined tolerances, the GOF may be terminated.

According to an embodiment, motion vectors may be determined for all pixelblocks in a candidate picture. Again, let $d_x$ and $d_y$ by the components of a motion vector (displacements) along the x and y directions. If a scene cut does not exist between a first picture of a GOF and the preceding picture, it can be assumed that the first picture of the GOF is a B-picture (picture no. 1). Starting with the first picture (picture 1), for each picture of the GOF, the system may compute the motion speed. The motion speed of a block b in the picture may be measured by slopes $S_x(n, b)$ and $S_y(n, b)$ and $S(n, b)$ as follows:

$$S_x(n, b) = \frac{d_x(n, b)}{n} \quad (1.)$$

$$S_y(n, b) = \frac{d_y(n, b)}{n} \quad (2.)$$

$$S(n, b) = S_{x+y}(n, b) = \frac{d_x(n, b) + d_y(n, b)}{n} \quad (3.)$$

Starting with picture 2, motion speed error may be calculated with respect to the motion speed of the first picture (B1) of the GOF:

$$e_x(n,b) = S_x(n,b) - S_x(1,b) \quad (4.)$$

$$e_y(n,b) = S_y(n,b) - S_y(1,b) \quad (5.)$$

$$e(n,b) = e_{x+y}(n,b) = S(n,b) - S(1,b) \quad (6.)$$

Thus, an error value can be obtained for each image block in the candidate picture. The system may compute the speed error for picture n (i.e., E(n)) as the mean of absolute speed errors of all blocks in the picture, in which case E(n) is given by:

$$E(n) = \sum_{1}^{N_{blocks}} \frac{|e(n, b)|}{N_{blocks}} \quad (7.)$$

where $N_{blocks}$ represents the number of pixelblocks per picture. As long as the error of a picture is less than a predetermined threshold value, that picture may be added to a group of pictures as a B picture. If not, then the picture may be coded as a P or I picture and the current group of pictures may be terminated.

The foregoing picture type decision scheme contributes to highly efficient coding of pictures. At a high level, the picture assignment scheme identifies pictures that exhibit a common motion speed and small speed errors among them. When these characteristics are identified, the picture type decision scheme classifies a relatively large number of candidate pictures as B pictures.

Figure 4:
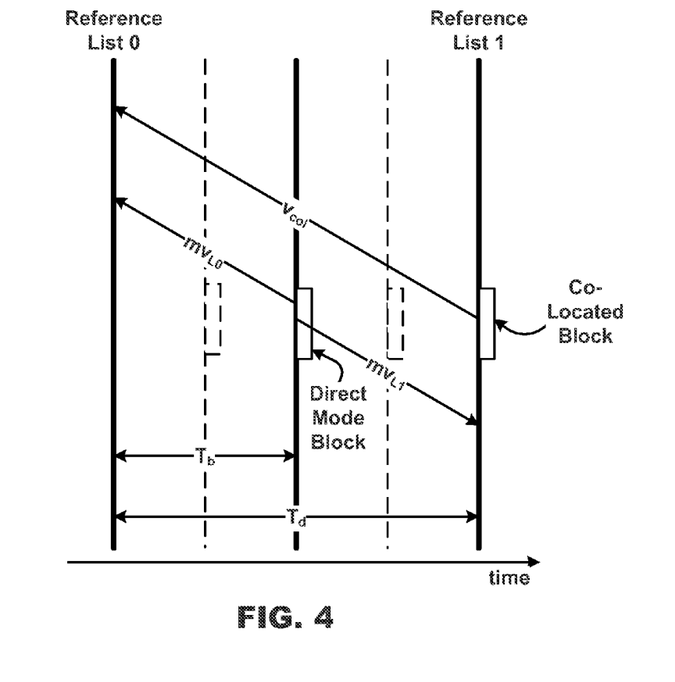
FIG. 4 illustrates operation of direct coding mode for B frames.

Tying frame type decisions to an observable pattern of motion speeds among pictures also can yield additional advantages in terms of coding effectiveness. Pictures may be coded according to the direct mode in H.263+ and H.264. In other words, not only more B frames are encoded, but they are also coded effectively. As illustrated in FIG. 4, in temporal direct mode motion vectors are interpolated from those in the co-located pixelblocks of the stored pictures. For a pixelblock in a B picture, the co-located pixelblock is defined as a pixelblock that resides in the same geometric location of the first reference picture in list 1, where list 1 and list 0 are lists of reference pictures stored in a decoded picture buffer. Given the motion vector of the co-located block $mv_{col}$, motion vectors $mv_{L0}$ and $mv_{L1}$ can be are interpolated with respect to the reference pictures in lists 0 and 1 (respectively) according to:

$$mv_{L0}(n) = k \frac{T_b}{T_d} mv_{col} \quad (8.)$$

$$mv_{L1}(n) = k \frac{T_d - T_b}{T_d} mv_{col} \quad (9.)$$

where n represents the picture for which the frame type decision is being made, and k is a constant that includes a distance scale factor and rounding. All motion vectors have x and y components. Notations $T_b$, $T_d$ represent differences between the picture order counts according to:

$T_b = DPOC(F_n, F_{L0})$ $T_d = DPOC(F_{L1}, F_{L0})$ where $F_n$, $F_{L0}$, $F_{L1}$ denote the current frame, a reference frame from list 0 and a reference frame from list 1, respectively. Of course, direct mode interpolation may be performed for all B pictures in a GOF such as those shown in phantom in FIG. 4.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of assigning frame types for coding of pictures in a video sequence, comprising:
    evaluating motion speed among a plurality of temporally adjacent pictures in the video sequence, the plurality starting with a reference picture;
    comparing, via the video coding system, the motion speed of a first picture temporally following the reference picture to motion speeds of each of a second plurality of pictures that follow the first picture; and
    assigning, via the video coding system, coding modes of one or more of the second plurality of pictures to be B pictures provided they exhibit motion speed consistent with the first picture and are temporally continuous with the first picture.

2. The method of claim 1 further comprising:
    assigning, via the video coding system, a coding mode of a following picture that exhibits motion speed not consistent with the first picture to be a P picture.

3. The method of claim 1 wherein evaluating motion speed of a picture following the first picture further comprises calculating a motion speed error as a degree of difference between a motion vector of the first picture and a motion vector of the following picture.

4. The method of claim 3 wherein a picture exhibits motion speed consistent with the first picture if the motion speed error of the picture does not exceed a predetermined threshold.

5. The method of claim 1 further comprising:
    upon detecting a termination condition, coding each picture in the plurality of pictures according to the assigned coding mode.

6. The method of claim 5 wherein said termination condition comprises detecting a scene change.

7. The method of claim 6 wherein detecting a scene change further comprises calculating a correlation coefficient between two temporally adjacent pictures.

8. The method of claim 7 wherein a scene change is detected where the correlation coefficient is below a predetermined threshold.

9. The method of claim 5 wherein said termination condition comprises assigning a number of consecutive pictures a coding mode of a B picture, wherein said number exceeds a predetermined threshold.

10. The method of claim 5 wherein said termination condition comprises assigning a picture a coding mode of an I picture or a P picture.

11. The method of claim 5 wherein said termination condition comprises detecting a picture is the last picture of the video sequence.

12. A video coder system, comprising:
a video coder to code a video sequence according to a variety of motion-compensated prediction modes;
a motion estimator to detect relative motion among frames of the video sequence; and
a picture type decision unit to select a coding mode for a plurality of frames of the video sequence based, at least in part, on relative motion between the plurality of frames, wherein the picture type decision unit assigns a new input frame to be coded as a B frame when:
the frame exhibits a motion speed consistent with a motion speed observed between a previously-coded reference frame and a first frame temporally adjacent to the reference frame, and
all frames between the first frame and the new input frame exhibit motion speed consistent with the motion speed of the first frame.

13. The video coder system of claim 12 wherein the picture type decision unit assigns a new input frame to be coded as a P frame when the frame exhibits a motion speed not consistent with the observed motion speed.

14. The video coder system of claim 12 wherein the picture type decision unit determines an input frame exhibits motion speed consistent with the observed motion speed by calculating a motion speed error as a degree of difference between a motion vector of the first frame and a motion vector of the input frame.

15. The video coder system of claim 14 wherein the input frame exhibits consistent motion speed if the motion speed error does not exceed a predetermined threshold.

16. The video coder system of claim 12 further comprising:
a buffer pool to store a group of frames until the picture type decision unit detects an end of group condition.

17. The video coder system of claim 16 wherein said condition comprises detecting a scene change with a scene change detector.

18. The video coder system of claim 17 wherein the scene change detector calculates a correlation coefficient between two temporally adjacent frames.

19. The video coder system of claim 18 wherein a scene change is detected where the correlation coefficient is below a predetermined threshold.

20. The video coder system of claim 16 wherein said condition comprises assigning a number of consecutive frames a coding mode of a B frame, wherein said number exceeds a predetermined threshold.

21. The video coder system of claim 16 wherein said condition comprises assigning a frame a coding mode of an I frame or a P frame.

22. The video coder system of claim 16 wherein said condition comprises detecting a frame is the last frame of the video sequence.

23. The video coder system of claim 16 wherein further comprising:
assigning a coding mode to the final frame in the group of frames to be a P frame.

24. A video coder system, comprising:
a video coder to code frames of a video sequence by motion-compensated prediction techniques, including a bidirectionally-predictive (B) coding mode, the video coder responsive to a picture assignment;
a motion vector generator to generate motion vectors for the frames of the video sequence, the motion vectors representing motion between a respective picture and a stored reference picture; and
a picture type decision unit to compare the motion for a plurality of temporally adjacent frames to the motion of a frame immediately following a reference frame and to assign B coding modes to frames that temporally follow a reference frame and exhibit mutually consistent motion between each other.

25. A method of coding video data comprising:
from a sequence of video data, determining a motion speed between a first picture and a reference picture;
for each consecutive picture in a plurality of temporally adjacent pictures following the first picture in the sequence, until a termination condition is met:
determining a motion speed for the reference picture;
coding the respective picture as a B picture if its motion speed is consistent with the motion speed of the first picture;
when the termination condition is met, coding a picture as a P picture; and
storing coded data of the B pictures and the P picture in a storage device.

26. The method of claim 25 wherein the motion speed for the respective picture is consistent with the motion speed of the first picture where a motion speed error does not exceed a predetermined threshold, the motion speed error calculated as a degree of difference between a motion vector of the respective picture and a motion vector of the first picture.

27. The method of claim 25 wherein said termination condition comprises detecting a scene change.

28. The method of claim 27 wherein a scene change is detected where a correlation coefficient between two temporally adjacent pictures is below a predetermined threshold.

29. The method of claim 25 wherein said termination condition comprises a number of consecutive pictures assigned a coding mode of a B picture exceeds a predetermined threshold.

30. The method of claim 25 wherein said termination condition comprises detecting a picture is the last picture of the video sequence.

31. The method of claim 25 wherein the step of storing coded data of the B pictures and the P pictures is a step of storing coded data of the B pictures and the P pictures in a buffer memory at an encoder.

* * * * *